(12) United States Patent
Kameo

(10) Patent No.: US 8,084,539 B2
(45) Date of Patent: Dec. 27, 2011

(54) RESIN COMPOSITION AND MOLDED ARTICLE COMPRISING THE SAME

(75) Inventor: Koji Kameo, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 220 days.

(21) Appl. No.: 12/637,071

(22) Filed: Dec. 14, 2009

(65) Prior Publication Data

US 2010/0160564 A1 Jun. 24, 2010

(30) Foreign Application Priority Data

Dec. 18, 2008 (JP) ................................. 2008-322766

(51) Int. Cl.
*C08L 67/02* (2006.01)
(52) U.S. Cl. .................... 525/165; 525/166; 525/176
(58) Field of Classification Search .................. 525/165, 525/166, 176
See application file for complete search history.

(56) References Cited

U.S. PATENT DOCUMENTS 6,110,849 A * 8/2000 Tsai et al. .................... 442/394
2007/0160861 A1* 7/2007 Shinoda et al. ............... 428/522
2008/0311320 A1* 12/2008 Hiruma et al. ............... 428/34.9
2009/0099313 A1* 4/2009 Uradnisheck ................ 525/221
2010/0273959 A1* 10/2010 Miyake et al. ............... 525/92 R
2011/0195210 A1* 8/2011 Li et al. ........................ 428/35.7

FOREIGN PATENT DOCUMENTS

JP 2007-106843 A 4/2007
JP 2007-277444 A 10/2007

* cited by examiner

Primary Examiner — Bernard Lipman
(74) Attorney, Agent, or Firm — Sughrue Mion, PLLC

(57) ABSTRACT

A resin composition is provided which comprises 10 to 88% by mass of a propylene-based polymer (A) composed of 30 to 70% by mass of a propylene-based polymer (a) having a melt flow rate of 0.1 to 17 g/10 minutes measured at a temperature of 230° C. and a load of 21.18N and 30 to 70% by mass of a propylene-based polymer (b) having a melt flow rate of 80 to 300 g/10 minutes measured at a temperature of 230° C. and a load of 21.18N; 10 to 88% by mass of a polylactic acid-based resin (B); 1 to 50% by mass of an ethylene-based polymer having an epoxy group (C); and 1 to 50% by mass of an elastomer (D).

4 Claims, No Drawings

RESIN COMPOSITION AND MOLDED ARTICLE COMPRISING THE SAME

BACKGROUND OF THE INVENTION

1. Field of the Invention

The present invention relates to a resin composition and a molded article thereof. Specifically, it relates to a resin composition containing a propylene-based polymer of a specific composition, a polylactic acid-based resin, an ethylene-based polymer having an epoxy group, and a prescribed elastomer, and a molded article thereof.

2. Background Art

Use of poly(lactic acid)-based resin, which is produced from plants, has recently been investigated. For example, JP 2007-106843 A discloses a resin composition comprising a polylactic acid-based resin, a polypropylene-based resin, and an epoxidized polyolefin. JP 2007-277444 A discloses a resin composition containing different elastomers from the ethylene-based polymer which has the a crystalline polypropylene-based polymer, a polylactic acid resin, an ethylene-based polymer having an epoxy group, and an elastomer different from the ethylene-based polymer having an epoxy group.

DISCLOSURE OF THE INVENTION

Summary of the Invention

However, the above-mentioned resin compositions are required to be improved in moldability and molded articles obtained therefrom are required to be improved in impact resistance.

In such a situation, the object of the present invention is to provide a resin composition that contains a polylactic acid-based resin and is excellent in moldability, and a molded article thereof that is excellent in impact resistance and is made of the composition.

In one aspect, the present invention is directed to a resin composition comprising 10 to 88% by mass of a propylene-based polymer (A) composed of 30 to 70% by mass of a propylene-based polymer (a) having a melt flow rate of 0.1 to 17 g/10 minutes measured at a temperature of 230° C. and a load of 21.18N and 30 to 70% by mass of a propylene-based polymer (b) having a melt flow rate of 80 to 300 g/10 minutes measured at a temperature of 230° C. and a load of 21.18N, 10 to 88% by mass of a polylactic acid-based resin (B), 1 to 50% by mass of an ethylene-based polymer having an epoxy group (C), and 1 to 50% by mass of an elastomer (D), provided that each of the aforesaid amounts of the propylene-based polymer (A), the polylactic acid-based resin (B), the ethylene-based polymer having an epoxy group (C), and the elastomer (D) is an amount relative to the total amount of these four components.

In a preferable embodiment, the propylene-based polymer (a) and/or (b) is at least one propylene-based polymer selected from the group consisting of a propylene homopolymer (A-1) and a propylene-ethylene copolymer (A-2).

In another aspect, the present invention is directed to a molded article of the aforesaid resin composition.

In the following description, the term "melt flow rate" is sometimes referred to as MFR.

According to the present invention, it becomes possible to provide a resin composition that contains a polylactic acid-based resin and is excellent in moldability, and a molded article thereof that is excellent in impact resistance.

DESCRIPTION OF THE PREFERRED EMBODIMENTS

The resin composition according to the present invention contains a propylene-based polymer (A) comprising at least one propylene-based polymer (a) having an MFR falling within a specific lower melt flow rate range and at least one propylene-based polymer (b) having an MFR falling within a specific higher melt flow rate range, a polylactic acid-based resin (B), an ethylene-based polymer having an epoxy group (C), and an elastomer (D).

[Propylene-Based Polymer (A)]

The propylene-based polymer (A) to be used for the present invention (henceforth, referred to also as component (A)) is a propylene-based polymer composed of a propylene-based polymer having an MFR, measured at a temperature of 230° C. and a load of 21.18N, of 0.1 to 17 g/10 minutes (henceforth, referred to also as component (a)) and a propylene-based polymer having an MFR, measured at a temperature of 230° C. and a load of 21.18N, of 80 to 300 g/10 minutes (henceforth, referred to also as component (b)). That is, the component (A) is a mixture of the component (a) that is a propylene-based polymer having a lower MFR and the component (b) that is a propylene-based polymer having a higher MFR.

As the component (a) and/or (b) which constitutes the component (A) is preferably used at least one propylene-based polymer that contains monomer units derived from propylene and that is selected from the group consisting of a propylene homopolymer (A-1) (henceforth, referred to also as component (A-1)) and a propylene-ethylene copolymer (A-2) (henceforth, referred to also as component (A-2)).

Examples of the propylene-ethylene copolymer (component (A-2)) include a propylene-ethylene random copolymer (A-2-1) (henceforth, referred to also as component (A-2-1)) and a propylene-ethylene block copolymer (A-2-2) (henceforth, referred to also as component (A-2-2)). The propylene-ethylene block copolymer (component (A-2-2)) is a polymer blend composed of a propylene homopolymer component and a propylene-ethylene random copolymer component.

From the viewpoint of the rigidity, heat resistance or hardness of a molded article, the component (A) is preferably a propylene homopolymer or a propylene-ethylene block copolymer.

The MFR of the propylene-based polymer that is component (a) is 0.1 to 17 g/10 minutes, and preferably 1 to 10 g/10 minutes. The melt flow rate as referred to herein is measured under conditions including a test load of 21.18 N and a test temperature of 230° C. in accordance with JIS K 7210 (1995).

As component (a), that is the propylene-based polymer having an MFR falling within the range of 0.1 to 17 g/10 minutes, either a single propylene homopolymer having an MFR falling within the above-mentioned range may be used alone or two or more propylene homopolymers each having an MFR falling within the above-mentioned range may be used in combination. Either a single propylene-ethylene copolymer having an MFR falling within the above-mentioned range may be used alone or two or more propylene-ethylene copolymers each having an MFR falling within the above-mentioned range may be used in combination.

The MFR of the propylene-based polymer that is component (b) is 80 to 300 g/10 minutes, and preferably 90 to 150 g/10 minutes. The melt flow rate as referred to herein is measured under conditions including a test load of 21.18 N and a test temperature of 230° C. in accordance with JIS K 7210 (1995).

The incorporation of the component (a) having an MFR falling within the aforementioned lower melt flow rate range contributes to achieving good injection moldability of the resin composition of the present invention and also contributes to attaining good impact resistance of a molded article of the resin composition.

The incorporation of the component (b) having an MFR falling within the aforementioned higher melt flow rate range contributes achieving good thin-wall moldability of the resin composition of the present invention and also contributes to attaining high strength of a molded article of the resin composition.

As component (b), that is the propylene-based polymer having an MFR falling within the range of 80 to 300 g/10 minutes, either a single propylene homopolymer having an MFR falling within the above-mentioned range may be used alone or two or more propylene homopolymers each having an MFR falling within the above-mentioned range may be used in combination. Either a single propylene-ethylene copolymer having an MFR falling within the above-mentioned range may be used alone or two or more propylene-ethylene copolymers each having an MFR falling within the above-mentioned range may be used in combination.

The isotactic pentad fraction measured by $^{13}$C-NMR of the component (A), i.e., the propylene homopolymer, is preferably 0.95 or more, and more preferably 0.98 or more.

The isotactic pentad fraction measured by $^{13}$C-NMR of the component (A-2-2), i.e., the propylene homopolymer component of the propylene-ethylene block copolymer, is preferably 0.95 or more, and more preferably 0.98 or more.

The isotactic pentad fraction is a fraction of propylene monomer units which are present at the center of an isotactic chain in the form of a pentad unit, in other words, the center of a chain in which five propylene monomer units are meso-bonded successively, in the propylene-based polymer molecular chain as measured by a method reported in A. Zambelli et al., Macromolecules, 6, 925 (1973), namely, by use of $^{13}$C-NMR. NMR absorption peaks are assigned in accordance with the disclosure of Macromolecules, 8, 687 (1975). Specifically, the isotactic pentad fraction is a ratio of the area of peaks assigned to mmmm polymerized chains to the total peak area in the methyl carbon ranges observed in a $^{13}$C-NMR spectrum. Henceforth, an sotactic pentad fraction is sometimes expressed by a sign [mmmm]. According to this method, the isotactic pentad fraction of an NPL standard substance, CRM No. M19-14 Polypropylene PP/MWD/2 available from NATIONAL PHYSICAL LABORATORY, G.B. was measured to be 0.944.

The intrinsic viscosity measured in Tetralin solvent of 135° C. of the component (A-1) ($[\eta]_P$), the intrinsic viscosity measured in Tetralin solvent of 135° C. of the propylene homopolymer component of the component (A-2-2) ($[\eta]_P$), and the intrinsic viscosity measured in Tetralin solvent of 135° C. ($[\eta]$) of the component (A-2-1) each are preferably 0.7 to 5 dl/g, and more preferably 0.8 to 4 dl/g.

The component (A-1), the propylene homopolymer component of the component (A-2-2), and the component (A-2-1) each preferably have a molecular weight distribution measured by gel permeation chromatography (GPC) of 3 to 7. The molecular weight distribution is defined as Mw/Mn, wherein Mw and Mn respectively represent a weight average molecular weight measured by GPC and a number average molecular weight measured by GPC. The measurement of an average molecular weights by GPC is carried out by using standard polystyrenes as molecular weight standard materials.

The content of ethylene contained in the propylene-ethylene random copolymer component of the component (A-2-2) is 20 to 65% by mass, and preferably 25 to 50% by mass, provided that the overall amount of the propylene-ethylene random copolymer component is let be 100% by mass.

The intrinsic viscosity measured in Tetralin solvent of 135° C. of the propylene-ethylene random copolymer component of the component (A-2-2) ($[\eta]_{EP}$) is preferably 1.5 to 12 dl/g, and more preferably 2 to 8 dl/g.

The content of the propylene-ethylene random copolymer component which constitutes the component (A-2-2) is preferably 10 to 60% by mass, and more preferably 10 to 40% by mass.

Next, as to the proportions of component (a) and component (b) constituting the component (A), the content of component (a) is 30 to 70% by mass and the content of component (b) is 30 to 70% by mass, provided that the total amount of component (a) and component (b) is let be 100% by mass.

By mixing component (a) and component (b) at those proportions, both good moldability of a resin composition and high impact resistance of a molded article made of the resin composition can be obtained at the same time.

Examples of the methods for producing component (a) and component (b) include a method comprising polymerizing monomers by using a Ziegler-Natta catalyst or a metallocene catalyst. The kind of the monomers to be used for the polymerization is chosen appropriately depending upon the structure of the polymer to be produced. Examples of the Ziegler-Natta catalyst include a catalyst system comprising a combination of a titanium-containing solid transition metal component and an organic metal component. Examples of the metallocene catalyst include catalyst systems each comprising a combination of a compound of a transition metal of any of Groups IV to VI of the periodic table having at least one cyclopentadienyl skeleton and a cocatalyst component.

Examples of the polymerization method include slurry polymerization, gas phase polymerization, bulk polymerization, solution polymerization, and methods composed of combinations of the aforesaid polymerization methods. These polymerization methods may be conducted either in a batch system or in a continuous system and either in single stage polymerization or in multi-stage polymerization. Moreover, commercially available propylene-based polymers may be used as component (a) and component (b).

[Polylactic Acid-Based Resin (B)]

The polylactic acid-based resin that the resin composition of the present invention (B) contains (henceforth, referred to also as component (B)) is a resin composed of a polymer composed only of a repeating unit derived from L-lactic acid and/or D-lactic acid, a resin composed of a copolymer composed of a repeating unit derived from L-lactic acid and/or D-lactic acid and a repeating unit derived from a monomer other than both L-lactic acid and D-lactic acid, or a resin composed of a mixture of a polymer composed only of a repeating unit derived from L-lactic acid and/or D-lactic acid and a copolymer composed of a repeating unit derived from L-lactic acid and/or D-lactic acid and a repeating unit derived from a monomer other than both L-lactic acid and D-lactic acid. The repeating unit derived from L-lactic acid and the repeating unit derived from D-lactic acid are sometimes referred to as an L-lactic acid-derived repeating unit and a D-lactic acid-derived repeating unit, respectively.

The monomer other than both L-lactic acid and D-lactic acid includes hydroxycarboxylic acids, such as glycolic acid, aliphatic polyhydric alcohols, such as butanediol, and aliphatic polycarboxylic acids, such as succinic acid. The component (B) can be produced by a method comprising dehydration polycondensing lactic acid (L-lactic acid, D-lactic acid, or a mixture of L-lactic acid and D-lactic acid) and, if necessary, other monomers, a method comprising ring-opening polymerizing a cyclic dimer of lactic acid (namely, lactide), a method comprising ring-opening polymerizing lactide and a cyclic bimolecular condensate of lactic acid and a hydroxycarboxylic acid other than lactic acid, or a method comprising ring-opening polymerizing lactide and/or a cyclic bimolecular condensate of lactic acid and a hydroxycarboxylic acid other than lactic acid, and, if necessary, a cyclic dimer of a hydroxycarboxylic acid other than lactic acid (e.g., glycolide) or a cyclic ester derived from a hydroxycarboxylic acid (e.g., ε-caprolactone).

When the component (B) contains a polymer containing both an L-lactic acid-derived repeating unit and a D-lactic acid-derived repeating unit, the content of the L-lactic acid-derived repeating unit or the content of the D-lactic acid-derived repeating unit in the polymer is preferably 80 mol % or more, more preferably 90 mol % or more, and even more preferably 95 mol % or more from the viewpoint of the heat resistance of a resin composition of the present invention.

The weight average molecular weight (Mw) of the component (B) is preferably 10,000 to 1,000,000, and more preferably 50,000 to 500,000. The molecular weight distribution (Mw/Mn) of the component (B) is preferably 1 to 4. Sign Mn represents a number average molecular weight. Average molecular weights Mw and Mn are measured by GPC by using standard polystyrenes as molecular weight standard substances.

[Ethylene-Based Polymer Having an Epoxy Group (C)]

The ethylene-based polymer having an epoxy group to be used in the present invention (C) (henceforth, referred to also as component (C)) is a copolymer that has a monomer unit derived from a monomer that has an epoxy group and a monomer unit derived from ethylene. Examples of a monomer that has an epoxy group include α,β-unsaturated glycidyl esters, such as glycidyl methacrylate and glycidyl acrylate and the like, α,β-unsaturated glycidyl ethers, such as allyl glycidyl ether and 2-methyl allyl glycidyl ether and the like. Glycidyl methacrylate is preferred.

The above-mentioned component (C) may have, in addition to the monomer unit derived from a monomer that has an epoxy group and the monomer unit derived from ethylene, a monomer unit derived from other monomers, examples of which include unsaturated carboxylic acid esters, such as methyl acrylate, ethyl acrylate, methyl methacrylate, and butyl acrylate, and unsaturated vinyl esters, such as vinyl acetate and vinyl propionate and the like.

In component (C), the content of the monomer unit derived from a monomer having an epoxy group is preferably 0.01 to 30% by mass, and more preferably 0.1 to 20% by mass. The content of all the monomer units in the ethylene-based polymer having an epoxy group is let be 100% by mass. The content of the monomer unit derived from the monomer having an epoxy group is measured by the infrared method.

The MFR of component (C) is preferably 0.1 g/10 minutes to 300 g/10 minutes, and more preferably 0.5 g/10 minutes to 80 g/10 minutes. The MFR of the component (C) is measured under conditions including a test load of 21.18 N and a test temperature of 190° C. in accordance with JIS K 7210 (1995).

As the method for producing component (C) is used a conventional method, examples of which include a method comprising copolymerizing a monomer having an epoxy group, ethylene, and, if necessary, other monomers by high-pressure polymerization, solution polymerization, emulsion polymerization, or the like, and a method comprising graft-polymerizing a monomer having an epoxy group to an ethylene-based polymer.

[Elastomer (D)]

Examples of the elastomer (D) (henceforth, referred to also as component (D)) include natural rubber, polybutadiene rubber, polyisoprene rubber, butyl rubber, amorphous or low-crystalline ethylene-based elastomer, butadiene-styrene elastomer, butadiene-acrylonitrile elastomer, hydrogenated or nonhydrogenated styrene-conjugated diene block elastomers, polyester rubber, acrylic rubber, and silicone rubber and the like. One kind of elastomer may be used alone or alternatively two or more kinds of elastomers may be used in combination as the component (D). Among those listed above, the ethylene-based elastomer is used preferably.

The ethylene-based elastomer is an elastomer that contains a monomer unit derived from ethylene and examples thereof include ethylene homopolymers, ethylene-α-olefin copolymers, and ethylene-unsaturated ester copolymers and the like. Moreover, further examples of the ethylene-based elastomer are copolymers of a polyunsaturated compound, such as conjugated dienes and nonconjugated dienes, ethylene and an α-olefin. One kind of ethylene-based elastomer may be used alone or alternatively two or more kinds of ethylene-based elastomers may be used in combination.

Preferable ethylene-based elastomers are ethylene-α-olefin copolymers, which are copolymers of ethylene and one or more α-olefins. Preferable α-olefins are α-olefins having 3 to 12 carbon atoms. Specific examples include propylene, 1-butene, 1-pentene, 1-hexene, 1-heptene, 1-octene, 1-nonene, 1-decene, 1-dodecene, 4-methyl-1-pentene, 4-methyl-1-hexene, vinylcyclohexane, vinylcyclohexene, styrene, norbornene, butadiene, and isoprene and the like.

In the present invention, the term "noncrystalline elastomer" means an elastomer such that no crystal fusion peak with a heat of fusion of 1 J/g or more is observed at from −100° C. to 200° C. by DSC. The term "low-crystalline elastomer" means an elastomer such that a crystal fusion peak with a heat of fusion of 1 to 30 J/g is observed at from −100° C. to 200° C. by differential scanning calorimetry (DSC).

Examples of a hydrogenated or nonhydrogenated styrene-conjugated diene-based block elastomer include styrene-isoprene copolymers, styrene-isoprene-styrene copolymers, styrene-ethylene-butene-styrene copolymers, styrene-butadiene copolymers, and styrene-butadiene-styrene copolymers and the like.

The MFR of the component (D) is preferably 0.1 g/10 minutes to 100 g/10 minutes from the viewpoint of the mechanical strength of a molded article to be obtained from the resin composition of the present invention. It is more preferably 0.3 g/10 minutes to 50 g/10 minutes, and particularly preferably 0.5 g/10 minutes to 40 g/10 minutes.

The MFR of the component (D) is measured under conditions including a test load of 21.18 N and a test temperature of 190° C. in accordance with JIS K 7210 (1995).

From the viewpoint of the mechanical strength (e.g., tensile strength at break) of a molded article to be obtained from the resin composition of the present invention, the density of the component (D) is 850 kg/m$^3$ to 910 kg/m$^3$, and more preferably 855 kg/m$^3$ to 900 kg/m$^3$.

The density of the component (D) is measured by the method provided in JIS K6760-1981.

From the viewpoint of the mechanical strength of a molded article to be obtained from the resin composition of the present invention, the molecular weight distributions (Mw/

Mn) of the component (D) is preferably 1.8 to 3.5, and more preferably 1.8 to 2.5, and most preferably 1.8 to 2.2.

From the viewpoint of the mechanical strength of a molded article to be obtained from the resin composition of the present invention, the melting temperature (this means a glass transition temperature Tg) of the component (D) is preferably 110° C. or lower, and more preferably 100° C. or lower. From the viewpoint of tensile elongation at break, the amount of the heat of fusion of an ethylene-based elastomer is preferably 110 J/g or less, and more preferably 100 J/g or less.

The elastomer to be used as component (D) can be produced by a conventional polymerization method using a conventional catalyst for olefin polymerization.

An ethylene-$\alpha$-olefin copolymer, for example, is preferably produced by solution polymerization, slurry polymerization, high-pressure ion polymerization, or vapor phase polymerization using a Ziegler-Natta type catalyst or a complex-based catalyst, such as a metallocene complex and a non-metallocene complex, or bulk polymerization or solution polymerization using a radical initiator. Particularly, it is preferable to use a method of conducting polymerization using a Ziegler-Natta type catalyst or a complex-based catalyst, and it is preferable to produce an ethylene-$\alpha$-olefin copolymer in the presence of a metallocene catalyst.

The MFR of the component (D) can be adjusted appropriately by adjusting the degree of polymerization in producing the component (D) by polymerization. The density of component (D) can be adjusted to 850 kg/m$^3$ to 910 kg/m$^3$ by appropriately adjusting the proportions of raw material monomers to be used for polymerization. The molecular weight distribution of component (D) can be adjusted by appropriately choosing the kind of a catalyst or polymerization conditions in polymerization.

As to the content of component (A), component (C), and component (D) each expressed as an amount relative to the total amount of these four components, the content of the component (A) is 10 to 88% by mass, the content of the component (B) is 10 to 88% by mass, the content of the component (C) is 1 to 50% by mass, and the content of the component (D) is 1 to 50% by mass. From the viewpoint of increasing the rigidity and improving the appearance of a molded article to be obtained from the resin composition of the present invention, it is preferable that the content of the component (A) be 30 to 70% by mass, the content of the component (B) be 10 to 50% by mass, the content of the component (C) be 2 to 30% by mass, and the content of the component (D) be 2 to 30% by mass.

The method for producing the resin composition of the present invention may be a method comprising melt-kneading components (A), (B), (C), and (D). The order of addition of the respective components in the melt-kneading is arbitrary. The kneading temperature is preferably 180 to 240° C.

In the present invention, in addition to the aforementioned components (A), (B), (C), and (D), other additional components may be added according to necessity unless such addition is against the purpose of the present invention is not impaired. Examples of such additional components include antioxidants, weather resistance improvers, nucleating agents, flame retarders, plasticizers, lubricants, antistatic agents, colorants, organic fillers, inorganic fillers, and other resins.

Examples of the inorganic fillers include glass fiber, carbon fiber, metal fiber, glass beads, mica, calcium carbonate, titanium oxide, zinc oxide, potassium titanate whisker, talc, kaolinite, bentonite, smectite, sepiolite, wollastonite, montmorillonite, clay, allophane, imogolite, fibrous magnesium oxysulfate, barium sulfate, glass flakes, and carbon black, and the like.

The average particle diameter of an inorganic filler other than fibrous one is preferably 0.01 to 500 μm, more preferably 0.1 to 100 μm, and more preferably 0.1 to 20 μm. The average particle diameter of an inorganic filler means a 50% equivalent particle diameter D50 which is determined from an integral distribution curve of the sub-sieve method which is produced by measuring a suspension of the inorganic filler in a dispersing medium, such as water and alcohol, by means of a centrifugal sedimentation type particle size distribution analyzer.

The average diameter of a fibrous inorganic filler is preferably 0.001 to 50 μm, and more preferably 0.01 to 30 μm. The average fiber length in a composition is 0.01 to 10000 μm, and preferably 0.1 to 1000 μm.

Examples of the production method of a molded article to be obtained from the resin composition of the present invention include such molding methods as injection molding, extrusion forming, rotation molding, vacuum molding, foam molding, and blow molding, and the like. A resulting molded article can be used suitably in industrial fields, such as automobiles and household electric appliances, because it is high in impact resistance.

EXAMPLES

The present invention is described in detail below with reference to Examples.
Evaluations of properties were performed by the following methods.
(1) Melt Flow Rate (MFR; Unit: g/10 min)
A melt flow rate was measured in accordance with JIS K7210 at a testing temperature of 190° C. or 230° C. and a testing load of 21.18 N.
(2) Izod Impact Strength (Unit: kJ/m$^2$)
Izod impact strength was measured at 23° C. by the method provided in JIS K7110 by using a notched specimen 3.2 mm in thickness that had been produced by injection molding and then mechanically notched.
Materials used in the Examples are as follows.
Component (A) Propylene-Based Polymer
Component (a)
(A1) "Noblen H501N" produced by Sumitomo Chemical Co., Ltd. (propylene homopolymer, MFR (measured at 230° C.)=3 g/10 minutes, [mmmm]=0.975, [η]=2.0 dl/g, Mw/Mn=5)
(A4) "Noblen AW564" produced by Sumitomo Chemical Co., Ltd. (propylene-ethylene block copolymer, MFR (measured at 230° C.)=9 g/10 minutes, the ratio of the propylene-ethylene random copolymer portion to the whole block copolymer=14% by mass, [mmmm] of the propylene homopolymer portion=0.975, [η]=1.7 dl/g, Mw/Mn=11)
Component (b)
(A2) "Noblen R101" produced by Sumitomo Chemical Co., Ltd. (propylene homopolymer, MFR (measured at 230° C.)=20 g/10 minutes, [mmmm]=0.975, [η]=1.4 dl/g, Mw/Mn=5)
(A3) "Noblen U501E1" produced by Sumitomo Chemical Co., Ltd. (propylene homopolymer, MFR (measured at 230° C.)=120 g/10 minutes, [mmmm]=0.975, [η]=0.9 dl/g, Mw/Mn=5)
(A5) "Noblen AX161E5" produced by Sumitomo Chemical Co., Ltd. (propylene-ethylene block copolymer, MFR (measured at 230° C.)=56 g/10 minutes, the ratio of the propylene-ethylene random copolymer portion to the whole block copolymer=14% by mass, [mmmm] of the propylene homopolymer portion=0.985, [η]=1.3 dl/g, Mw/Mn=11)
(A6) "Noblen AU161C" produced by Sumitomo Chemical Co., Ltd. (propylene-ethylene block copolymer, MFR (measured at 230° C.)=90 g/10 minutes, the ratio of the propylene-ethylene random copolymer portion to the whole block copolymer=11% by mass, [mmmm] of the propylene homopolymer portion=0.985, [η]=1.4 dl/g, Mw/Mn=11)
Component (B) Polylactic Acid-Based Resin
(B1) The ethylene-based polymer containing the "Terramac TE-2000" produced by Unitika Ltd. (polylactic acid resin, MFR (measured at 230° C.)=40 g/10 minutes, Mw=120,000, Mw/Mn=1.8)
Component (C) Ethylene-Based Polymer Having an Epoxy Group
(C1) "Bondfast E" produced by Sumitomo Chemical Co., Ltd. (ethylene-glycidyl methacrylate copolymer, MFR (measured at 190° C.)=3 g/10 minutes, the content of monomer units derived from glycidyl methacrylate=12% by mass)
Component (D) Elastomer
(D1) "Engage 8842" produced by The Dow Chemical Company (ethylene-octene copolymer, MFR (measured at 190° C.)=1.2 g/10 minutes, density=0.858 g/cm$^3$)

Example 1

(Resin Composition)
A resin composition according to the present invention was produced by the following method.
A resin composition was produced by kneading a propylene homopolymer (A1), a propylene homopolymer (A3), a polylactic acid resin (B1), an ethylene-based polymer having an epoxy group (C1), and an elastomer (D1) in the composition given in Table 1, by using a 50 mmφ twin-screw kneading extruder (TEM50 manufactured by Toshiba Machine Co., Ltd.), at a cylinder temperature of 190° C., an extrusion rate of 50 kg/hr, and a screw speed of 200 rpm.
(Injection Molded Article)
Specimens for property evaluation were prepared under the following injection molding conditions. The resin composition obtained above was subjected to injection molding by using a Sycap 50 injection molding machine manufactured by Sumitomo Heavy Industries, Ltd., at a molding temperature of 200° C., a mold cooling temperature of 35° C., an injection time of 25 seconds, and a cooling time of 25 seconds. The MFR of the resin composition and the Izod impact strength of the resulting injection molded articles were measured. The results are set forth in Table 1.

Example 2

A resin composition and injection molded articles were produced in the same procedures as Example 1 by mixing a propylene-ethylene block copolymer (A4), a propylene-ethylene block copolymer (A6), a polylactic acid resin (B1), an ethylene-based polymer having an epoxy group (C1), and an elastomer (D1) in the composition given in Table 1. The MFR of the resin composition and the Izod impact strength of the resulting injection molded articles were measured. The results are set forth in Table 1.

Comparative Example 1

A resin composition and injection molded articles were produced in the same procedures as Example 1 by mixing a propylene homopolymer (A2), a polylactic acid resin (B1), an ethylene-based polymer having an epoxy group (C1), and an elastomer (D1) in the composition given in Table 1. The MFR of the resin composition and the Izod impact strength of the resulting injection molded articles were measured. The results are set forth in Table 1.

Comparative Example 2

A resin composition and injection molded articles were produced in the same procedures as Example 1 by mixing a propylene homopolymer (A2), a propylene homopolymer (A3), a polylactic acid resin (B1), an ethylene-based polymer having an epoxy group (C1), and an elastomer (D1) in the composition given in Table 1. The MFR of the resin composition and the Izod impact strength of the resulting injection molded articles were measured. The results are summarized in Table 1.

Comparative Example 3

A resin composition and injection molded articles were produced in the same procedures as Example 1 by mixing a propylene-ethylene block copolymer (A5), a propylene homopolymer (A2), a polylactic acid resin (B1), an ethylene-based polymer having an epoxy group (C1), and an elastomer (D1) in the composition given in Table 1. The propylene homopolymer (A2) was incorporated in order to make the content of the elastomer in the resulting composition equal to that in Example 2. The MFR of the resin composition and the Izod impact strength of the resulting injection molded articles were measured. The results are summarized in Table 1.

TABLE 1

|  | Example | | Comparative Example | | |
| --- | --- | --- | --- | --- | --- |
|  | 1 | 2 | 1 | 2 | 3 |
| Components (% by mass) | | | | | |
| (A1) | 20 | 0 | 0 | 0 | 0 |
| (A2) | 0 | 0 | 45 | 30 | 4 |
| (A3) | 25 | 0 | 0 | 15 | 0 |
| (A4) | 0 | 25 | 0 | 0 | 0 |
| (A5) | 0 | 0 | 0 | 0 | 46 |
| (A6) | 0 | 25 | 0 | 0 | 0 |
| (B1) | 30 | 30 | 30 | 30 | 30 |
| (C1) | 10 | 10 | 10 | 10 | 10 |
| (D1) | 15 | 10 | 15 | 15 | 10 |
| Content of elastomer in the composition | 15 | 16 | 15 | 15 | 16 |
| Property | | | | | |
| MFR (g/10 min) | 8 | 11 | 8 | 11 | 17 |
| Izod impact strength (kJ/m$^2$) | 64 | 40 | 30 | 30 | 15 |

The resin composition of the present invention containing a polylactic acid-based resin is excellent in moldability, and a molded article obtained from the resin composition is excellent in impact resistance. Therefore, they can be used in such fields as household electrical appliances and automotive interior and exterior components.

What is claimed is:
1. A resin composition comprising
10 to 88% by mass of a propylene-based polymer (A) composed of 30 to 70% by mass of a propylene-based polymer (a) having a melt flow rate of 0.1 to 17 g/10 minutes measured at a temperature of 230° C. and a load of 21.18N and 30 to 70% by mass of a propylene-based polymer (b) having a melt flow rate of 80 to 300 g/10 minutes measured at a temperature of 230° C. and a load of 21.18N, 10 to 88% by mass of a polylactic acid-based resin (B), 1 to 50% by mass of an ethylene-based polymer having an epoxy group (C), and 1 to 50% by mass of an elastomer (D), provided that each of the aforesaid amounts of the propylene-based polymer (A), the polylactic acid-based resin (B), the ethylene-based polymer having an epoxy group (C), and the elastomer (D) is an amount relative to the total amount of these four components.

2. The resin composition of claim 1, wherein the propylene-based polymer (a) and/or (b) is at least one propylene-based polymer selected from the group consisting of a propylene homopolymer and a propylene-ethylene copolymer.

3. A molded article of the resin composition of claim 1.

4. A molded article of the resin composition of claim 2.

* * * * *